United States Patent
Naumann et al.

(10) Patent No.: US 6,198,795 B1
(45) Date of Patent: Mar. 6, 2001

(54) METHOD OF PROCESSING IMAGES FOR MATERIAL RECOGNITION BY X-RAYS

(75) Inventors: Dirk Naumann, Lorsch; Rainer Henkel, Schweppenhausen; Knut Beneke, Ober-Olm, all of (DE)

(73) Assignee: Heimann Systems GmbH, Wiesbaden (DE)

( * ) Notice: Subject to any disclaimer, the term of this patent is extended or adjusted under 35 U.S.C. 154(b) by 0 days.

(21) Appl. No.: 09/272,302

(22) Filed: Mar. 19, 1999

(30) Foreign Application Priority Data

Mar. 19, 1998 (DE) .............................. 198 12 055

(51) Int. Cl.[7] ................. G01N 23/083; G01N 23/04; G01N 23/10
(52) U.S. Cl. ................................... 378/57; 378/62
(58) Field of Search .................... 378/53, 57, 62

(56) References Cited

U.S. PATENT DOCUMENTS 4,856,404 * 8/1989 Geluk ................... 378/146
5,974,111 * 10/1999 Krug et al. ............... 378/57

FOREIGN PATENT DOCUMENTS

| 31 42 759 | 5/1983 | (DE) . |
| 44 06 956 | 1/1997 | (DE) . |
| 0 825 457 | 2/1998 | (EP) . |
| 92/02892 | 2/1992 | (WO) . |

* cited by examiner

*Primary Examiner*—David V. Bruce
(74) *Attorney, Agent, or Firm*—Venable; Gabor J. Kelemen

(57) ABSTRACT

An image processing method for recognizing a material contained in an article includes the following steps: transilluminating the article with X-rays; generating, by an X-ray detector, signals representing the X-rays passing through the article; applying the signals to a computer system as continuous image data; subdividing the image data into defined zone-wise image strips; briefly storing the image strips in an image data memory; and determining the material from the image strips before a completion of the transilluminating step.

7 Claims, 2 Drawing Sheets

METHOD OF PROCESSING IMAGES FOR MATERIAL RECOGNITION BY X-RAYS

CROSS REFERENCE TO RELATED APPLICATION

This application claims the priority of German Application No. 198 12 055.9 filed Mar. 19, 1998, which is incorporated herein by reference.

BACKGROUND OF THE INVENTION

This invention relates to a method for processing images to recognize materials by means of X-rays in which the X-rays, emitted by a radiation source, have different energy spectra. The X-rays which penetrate an article, such as a piece of luggage containing the materials to be examined, are received by a detector, converted into signals and evaluated by a computer system.

The X-rays transilluminate the articles, such as pieces of luggage, for classifying the materials carried therein to prevent luggage holding prohibited items, for example, explosives, from clearing the safety checkpoints.

An apparatus for transilluminating luggage with X-rays is disclosed, for example, in German Offenlegungsschrift 31 42 759. The luggage is subdivided visually into local, narrow strips which are transilluminated with X-rays emanating from two X-ray sources. The weakening of the X-rays is measured at least by one line or strip-like bank of detectors and applied to an image memory. In order to obtain an overall image of the examined luggage, the separately stored measuring values obtained from the rays of the different X-ray sources are recombined by means of an electronic image processing system into a single image after the passage of the luggage.

A method for detecting luggage containing prohibited items is disclosed, for example, in German Patent No. 44 06 956. According to the method described therein, the luggage is examined in a multi-stage detector arrangement in which in a lower process stage a subdivision of the luggage into at least a two-dimensional coordinate system is effected and in a higher process stage exclusively a local examination of those luggage zones takes place which have not been unequivocally cleared.

It has been found in practice, however, that the above-outlined methods are time-consuming because the results are available only after a complete passage of the luggage and thus only after the construction of the overall image.

SUMMARY OF THE INVENTION

It is an object of the invention to provide an improved method of the above-outlined type with which results, particularly as concerns the materials enclosed in an article, may be obtained as early as during the introduction of the article into the path of the X-rays.

This object and others to become apparent as the specification progresses, are accomplished by the invention, according to which, briefly stated, the image processing method for recognizing a material contained in an article includes the following steps: transilluminating the article with X-rays having different energy spectra; generating, by an X-ray detector, signals representing the X-rays passing through the article; applying the signals to a computer system as continuous image data; subdividing the image data into defined zone-wise image strips; briefly storing the image strips in an image data memory; and determining the material from the image strips before completing the transillumination of the article.

The invention is based on the principle that the image data detected during a transillumination of an article are subdivided into image strips or lines and such image lines are, for a short period of time, temporarily stored in a memory as image strips to access the necessary information line by line. For this purpose, detectors supply continuous image lines which are inputted in the image memory, stored and thus stripwise evaluated or processed. In case of an on-line evaluation between the material determined from the image lines and the characteristics of the material stored in the memory, even before the construction of the image, that is, as early as during a partial transillumination of the article, a determination can be made whether the material is a prohibited substance.

The above-outlined image processing method according to the invention provides for the possibility of automatically distinguishing from one another and identifying several juxtapositioned and/or superpositioned materials. For this purpose, during the transillumination of the article, the continuously inputted image data (image dots) are combined into short image pieces and, for example, stored sequentially in a memory. With the aid of the different energy ranges the first material is determined. Such a step, as known, is performed by utilizing the weakened X-rays since the material and the material thickness affect the absorption of the X-ray radiation. If in such an image piece a further unknown material is present, then the already-determined material is filtered out of the image piece so that for the image processing there remains the determination of the second, unknown material. This means that from originally four unknown magnitudes for determining the materials two are already known and thus, the determination of the second material needs to be concentrated only to two unknown quantities. The determination of these two unknown quantities is effected in a known manner. If in the selected image piece a further material is present, then the already-determined materials are computed out or filtered out from the now necessary determination. To prevent the image processing from containing not well-determined ("watered down") regions which may be present, since typically image processing functions cannot work correctly up to the edge of the image, the image strips are used in an overlapping fashion so that no image data are influenced by the edge effects to thus be lost during the evaluation.

DESCRIPTION OF THE PREFERRED EMBODIMENT

Figure 1:
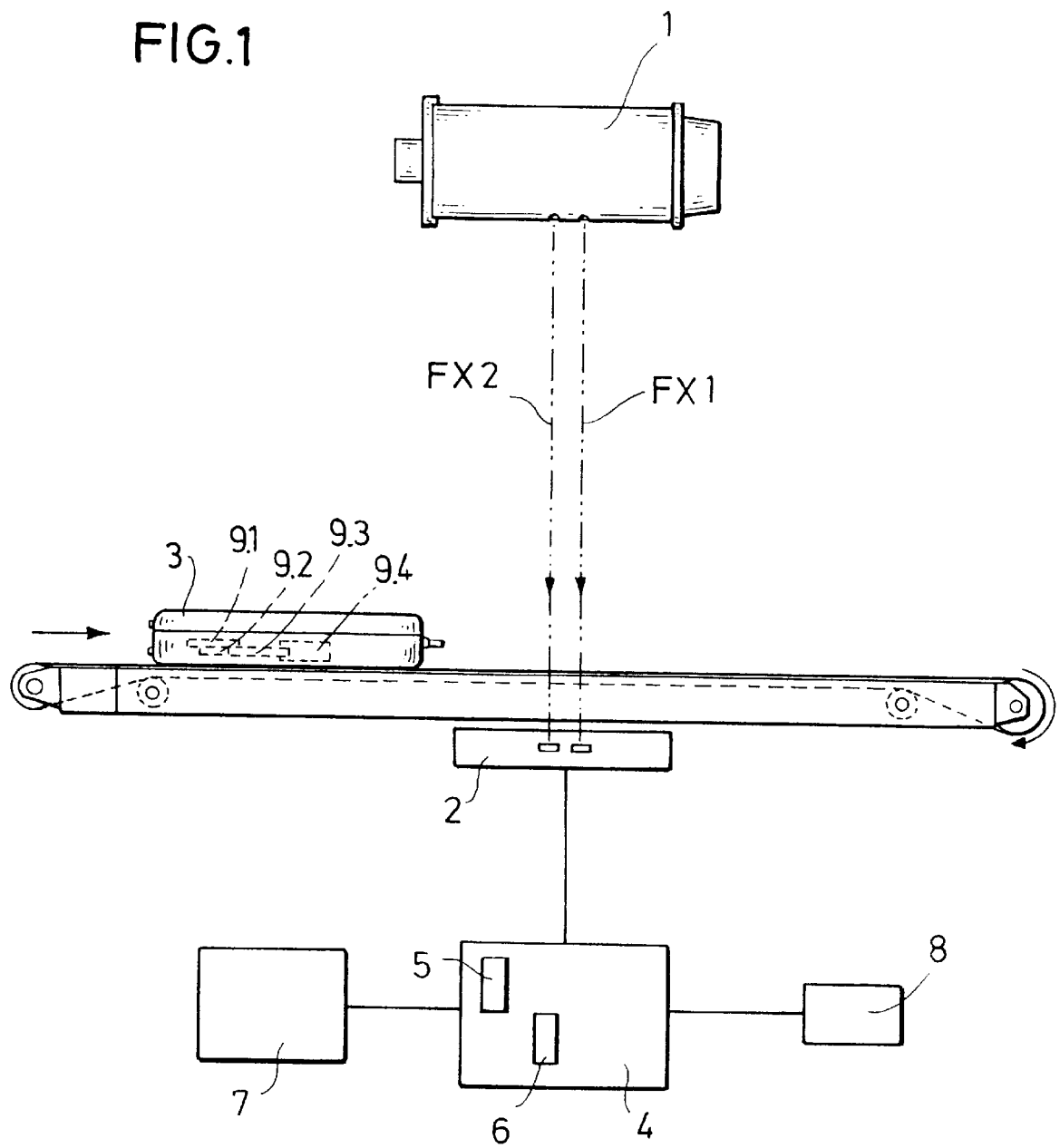
FIG. 1 is a schematic side elevational view of an X-ray examining apparatus incorporating the invention.

FIG. 1 shows a measuring device having two X-ray generating sources combined in an X-ray generating apparatus 1 and a detector device 2. An article 3 which may be a piece of luggage in which various materials 9.1–9.4 are contained in an overlapping and/or interleaving relationship, is positioned between the detector device 2 and the radiation generator 1. A computer system 4 which includes a memory 5 is connected with the detector device 2. The memory 5 which is an image memory, is coupled to a further memory 6 in which material-characteristic data are stored. A display device, such as a monitor 7 or a printer 8 provides for a visual representation of the measuring results.

In the description which follows, the image processing method according to the invention will be set forth.

Figure 2:
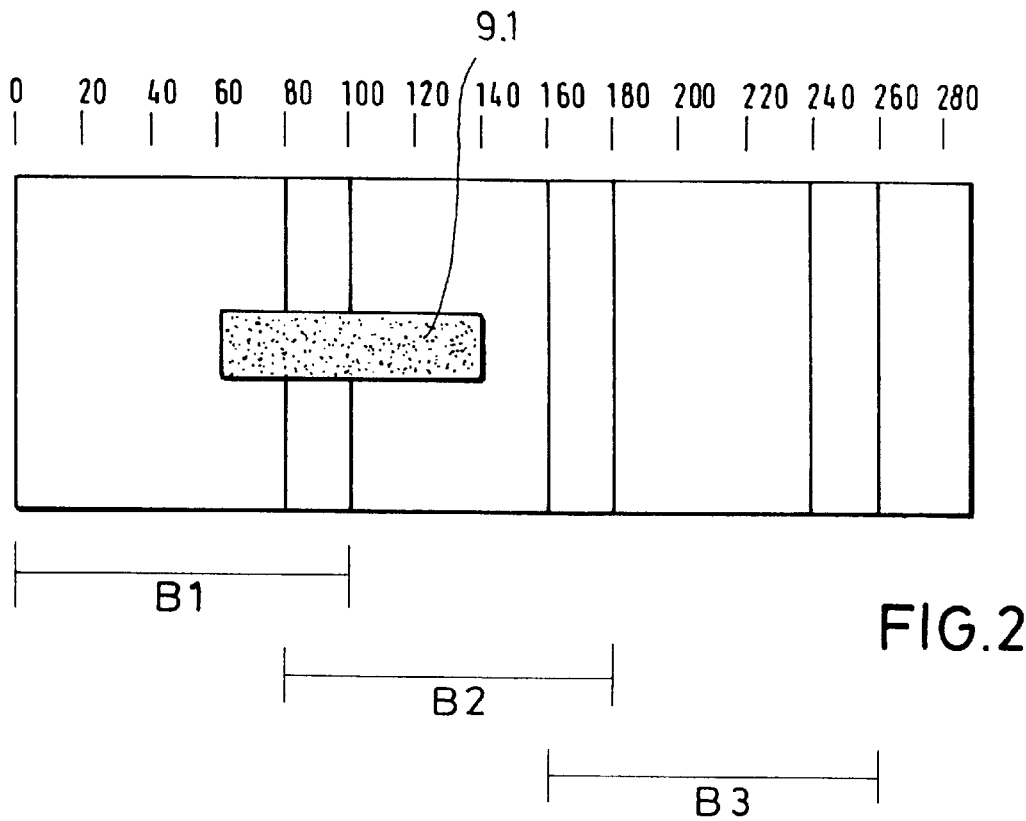
FIG. 2 is a diagram illustrating an image data flow with one detected material.

From the radiation generator 1 two X-ray beams FX1 and FX2 are directed to the article 3 to be transilluminated. The X-ray beams FX1 and FX2 have different energy ranges and are weakened by the absorption behavior of the respective various materials 9.1, 9.2, 9.3 and 9.4 in the article 3 and by the housing material of the article 3 and are detected by the detector 2. The detector 2 which may be a line camera composed of a plurality of photodiodes, produces signals from the non-absorbed X-rays. The signals are, as image data information concerning the transilluminated article 3, applied to the computer system 4 for image processing. Such an inputting is effected line-by-line and continuously, that is, for a duration of a few milliseconds for each image line. The continuous image data are, in an intermediate manner, stored in the image data memory 5 for an image processing. For this purpose, the image data memory 5 is programmed such that in the image data memory 5 a defined number of image lines are stored as image strips B1, B2, B3, etc. Each image strip B1–B3 is composed preferably of 100 image lines per image strip width $n_B$. Since typically an image processing function does not work correctly up to the edge of an image, the image strips B1–B3 are positioned preferably in an overlapping manner as shown in FIG. 2, so that no image data are influenced by such edge effects. The edge width $n_R$ is preferably defined by 10 image lines. Thus, although during the processing between the image strips B1, B2, B3, etc. an overlap $n_ü$ of 20 image lines is present which are twice processed, a data loss is nevertheless prevented.

The image lines 0–99 applied continuously to the computer system 4, are, after the introduction of the 99$^{th}$ image line, transmitted as a complete image strip B1 to the image data memory 5 and processed therein. The image processor supplies the results for the image lines 10 to 89, that is, these results are 10 to 90 image lines old. As the image lines 80 to 179 arrive as the image strip B2, the latter is temporarily applied to the image data memory 5, and the image strip B1 is overwritten after the 99$^{th}$ image line. As early as during the storing of the image strip B1, the image processing function finds a result between lines 60 and 100 in which the material 9.1 is situated. The result found in the image strip B2 is the material 9.1 between image lines 80 and 140. These two results are combined into a result between lines 60 and 140 in which the entire material 9.1 can be found. With the aid of known equations the material 9.1 is determined and classified by comparing it with characteristic data obtained from the memory 6.

Figure 3:
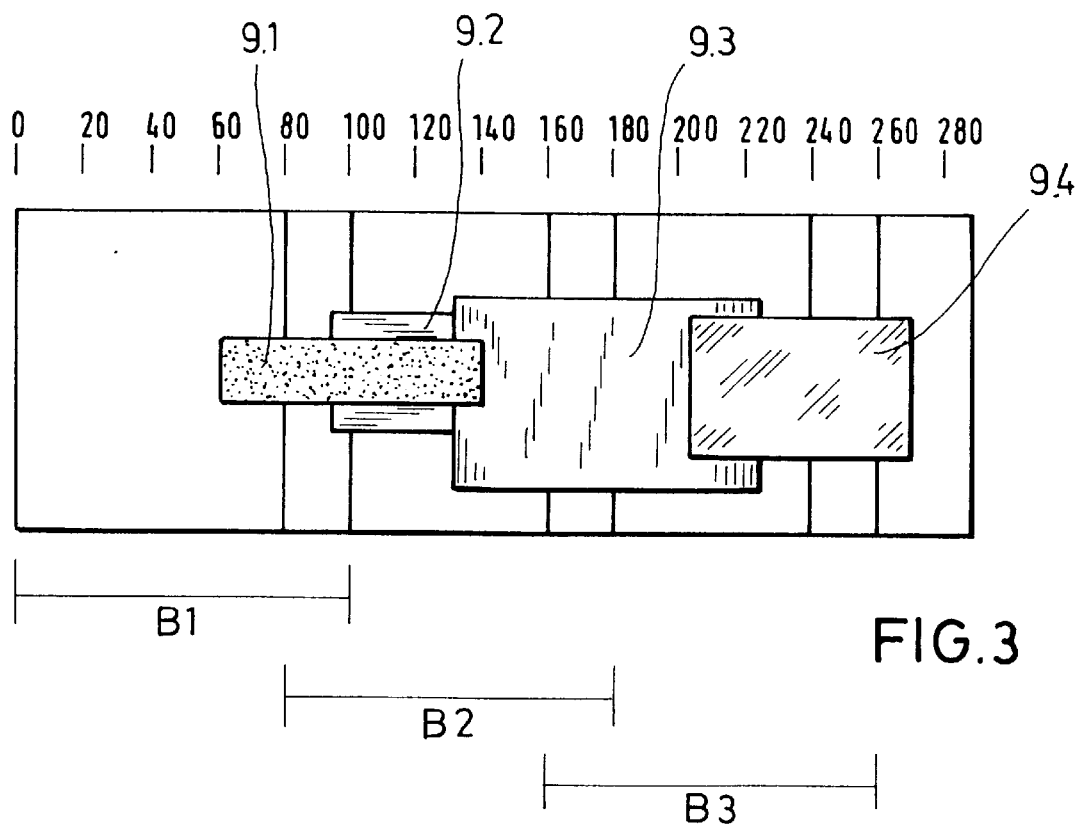
FIG. 3 is a diagram illustrating an image data flow with several detected materials.

By means of the method according to the invention it is also possible to classify all the materials 9.1–9.4 if, as shown in FIG. 3, two or more materials 9.1–9.4 are present in the image lines B1–B3. For this purpose, the results as already described above, are determined from the image strips B1, B2 and B3. The result for the material 9.1 is present in the image strips B1 and B2 again between lines 60 and 140, whereas the result for the material 9.2 is present in the image strips B1 and B2 between lines 95 and 135. The first material 9.1 is classified from the result between lines 60 and 140 and taken into account in the determination of the material 9.2. For this purpose, the material already determined between lines 60 and 140 is filtered out in the region of lines 95–135, so that only the unknown material from lines 95–135 has to be considered and determined. Here too, the classification of the material 9.2 is carried out in a known manner. The material 9.3 which may be found between lines 135 to 225 in the image strips B2 and B3, is determined in an equivalent manner. Likewise, the material 9.4 between lines 205 to 260 is determined in the image strip B3 in the same manner, in which case a further image strip B4 (not shown) is needed to detect the end of material 9.4.

By using the overlapping image strips B1, B2, B3, etc., it is possible to utilize, for a continuous image data flow, all types of image processing functions, for example, also those whose operation is zone-based. The results of adjoining image strips are coupled to one another if the results of the image processing function are greater than the image strips B1, B2 and B3 or if these project beyond the overlap regions no. The results of the adjoining image strips B1, B2, B3 are strung to one another to obtain an overall result therefrom. The image data flow is subdivided into image strips B1, B2 and B3 which, in each instance, are each sufficiently large to be processed by the image processing functions. The proposed image strip width $n_B$ is obtained from the task to find and assemble results by an earliest possible moment. This means that the smaller the image strips B1, B2, B3 selected, the greater the percentage range of the overlaps no with respect to the image strip width $n_B$ which requires an increased processing of double information in the computer system 4, resulting in a slow-down, that is, the reaction time increases. If the image strips B1, B2, B3 are selected to be wider, then, although the image lines are less frequently processed in a multiple fashion, the average reaction time of the computer system increases.

The number of the image lines for forming the image strips B1, B2, B3 may be decreased or increased by taking into consideration a desired reaction time of the computer system 4. A minimum reaction time is obtained from the given edge width $n_R$ and a maximum reaction time is given by the difference between the image strip width $n_B$ and the edge width $n_R$. It has been found in practice that the computer system 4 is capable of processing sufficiently rapidly an image strip width $n_B$ of 90–110 image lines. The 100 image lines given in the example represent an optimized embodiment. The multiple processing which is obtained from $n_ü/(n_B-n_ü)$ is small.

It is to be understood that changes may be made within the spirit of the invention. Thus, for example, the data or the image data flow may be taken from a non-illustrated pre-processing stage. Such a pre-processing stage may then, by an offset, compensate for or correct the structural problems of the detectors. In this manner more concrete results may be obtained in the image processing. Also, the storage of the image lines B1, B2 and B3 may occur in separate memory locations, that is, they need not be overwritten.

The invention may be used primarily for determining the presence of dangerous goods, for example, explosives. The invention may also be used, for example, in a non-material discriminating X-ray system for evaluation of high absorption objects.

It will be understood that the above description of the present invention is susceptible to various modifications, changes and adaptations, and the same are intended to be comprehended within the meaning and range of equivalents of the appended claims.

What is claimed is:

1. An image processing method for recognizing a material contained in an article comprising the following steps:

(a) transilluminating the article with X-rays;

(b) generating, by an X-ray detector, signals representing the X-rays passing through the article;

(c) applying the signals to a computer system as continuous image data;

(d) subdividing the image data into defined zone-wise image strips;

(e) briefly storing the image strips in an image data memory; and (f) determining the material from the image strips before a completion of step (a).

2. The method as defined in claim 1, further comprising the steps of overlappingly connecting said image strips with one another and processing twice the zones of overlap.

3. The method as defined in claim 1, further comprising the step of stringing adjoining image strips together if the material is larger than a single image strip.

4. The method as defined in claim 1, wherein step (d) comprises the step of forming each said image strip such that an image strip width is composed of 90–110 image lines.

5. The method as defined in claim 4, wherein the number of image lines is 100.

6. The method as defined in claim 1, further comprising the steps of determining a plurality of materials within at least one image strip and filtering out already determined materials between the image lines of the image strips.

7. The method as defined in claim 1, further comprising the step of identifying the kind of the determined materials by a comparison with characteristic data stored in a memory.

\* \* \* \* \*